May 16, 1961 N. P. GRELLER 2,984,366
CONVEYOR SYSTEM
Original Filed Jan. 28, 1955 5 Sheets-Sheet 1
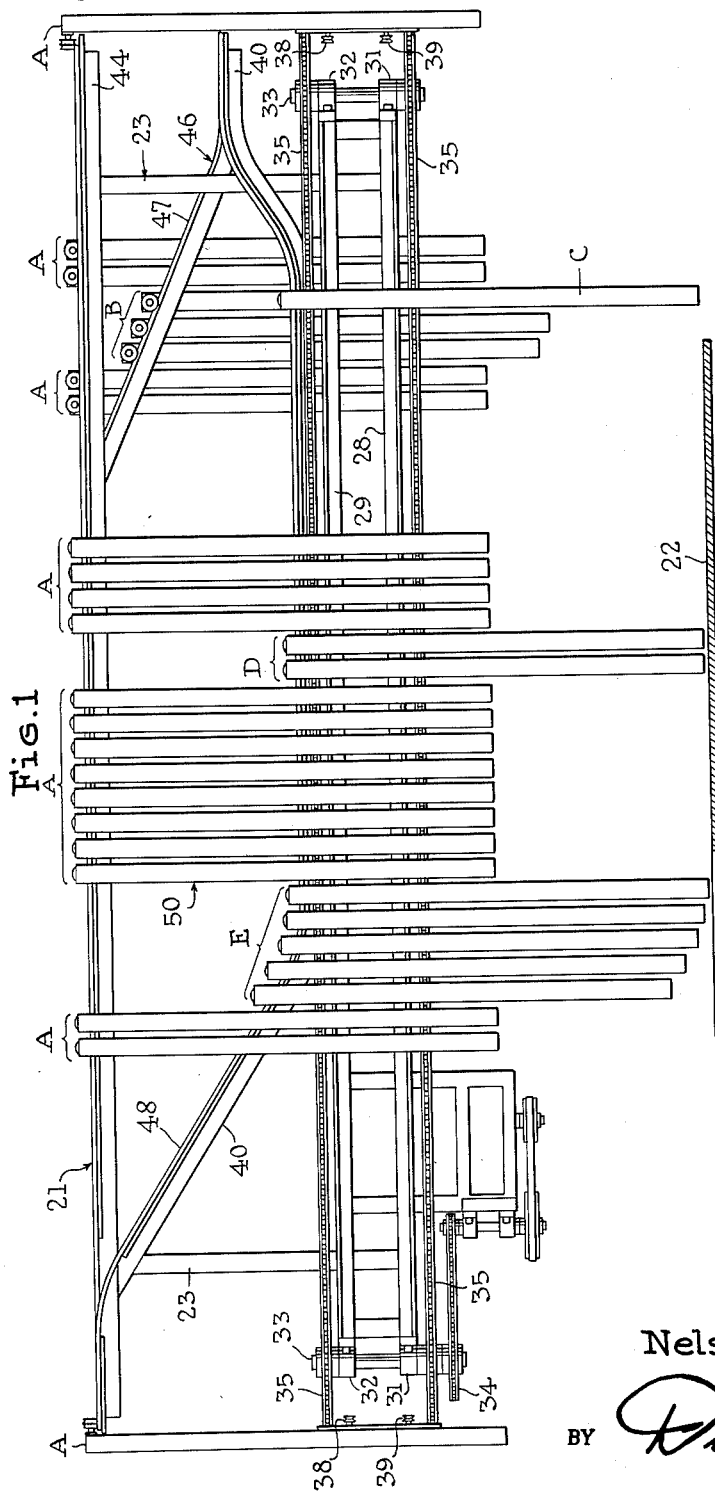
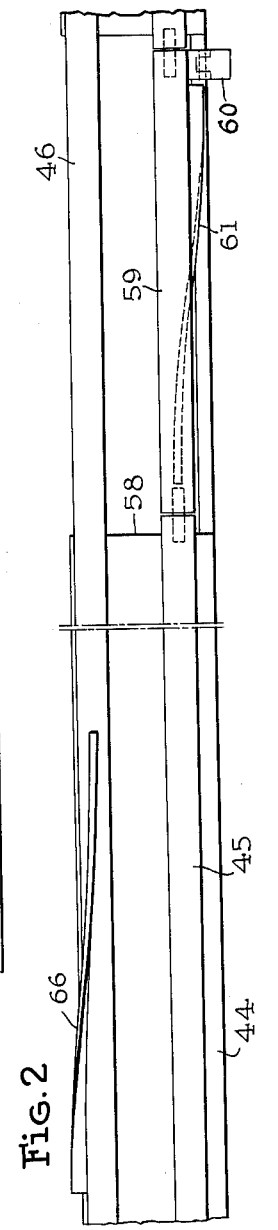
INVENTOR
Nelson P. Greller
BY
ATTORNEYS May 16, 1961 N. P. GRELLER 2,984,366
CONVEYOR SYSTEM
Original Filed Jan. 28, 1955 5 Sheets-Sheet 2
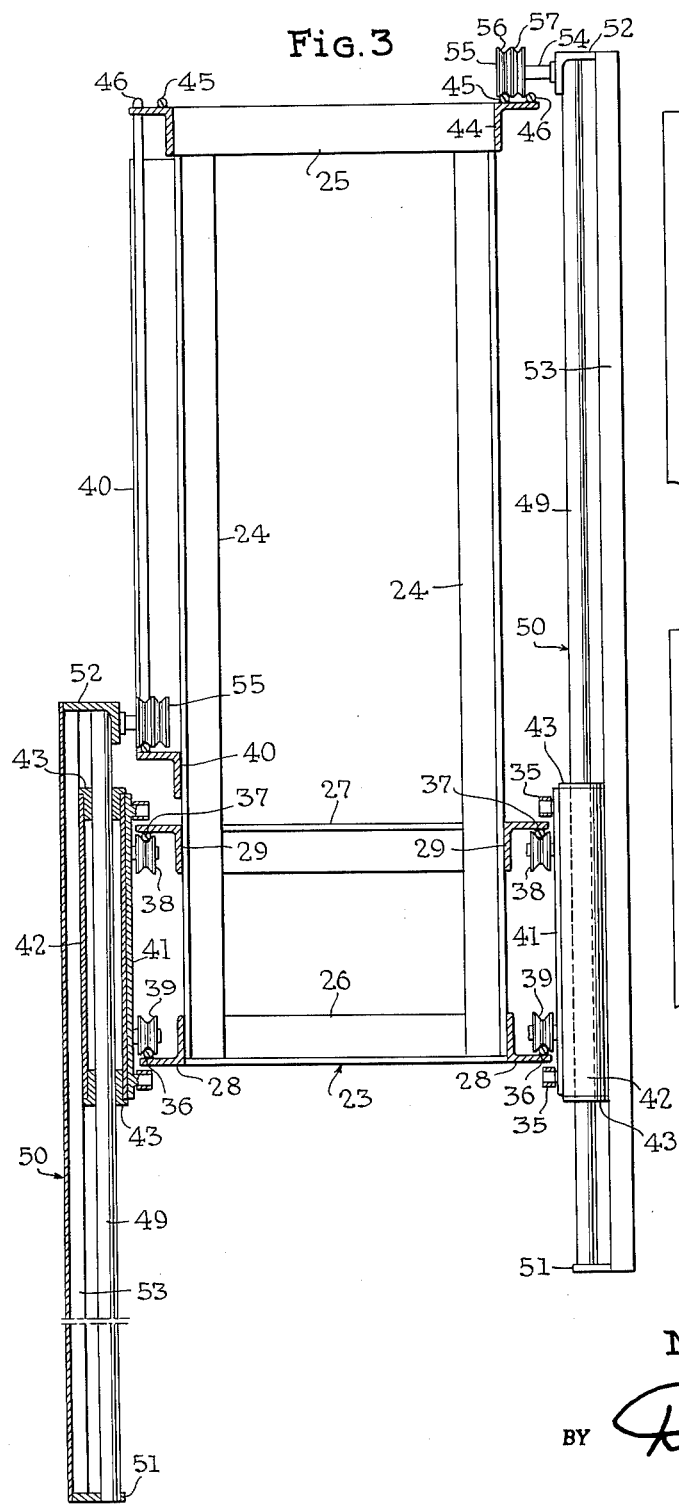
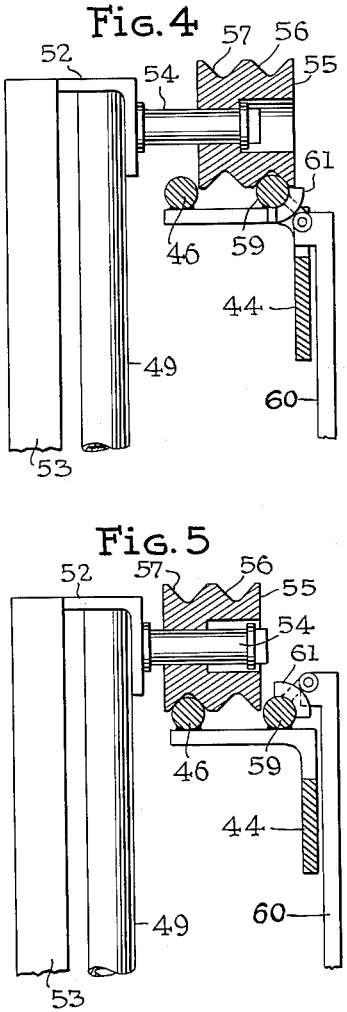
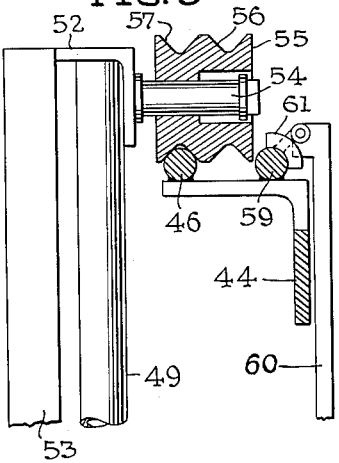
INVENTOR
Nelson P. Greller
BY Dodge and Son
ATTORNEYS

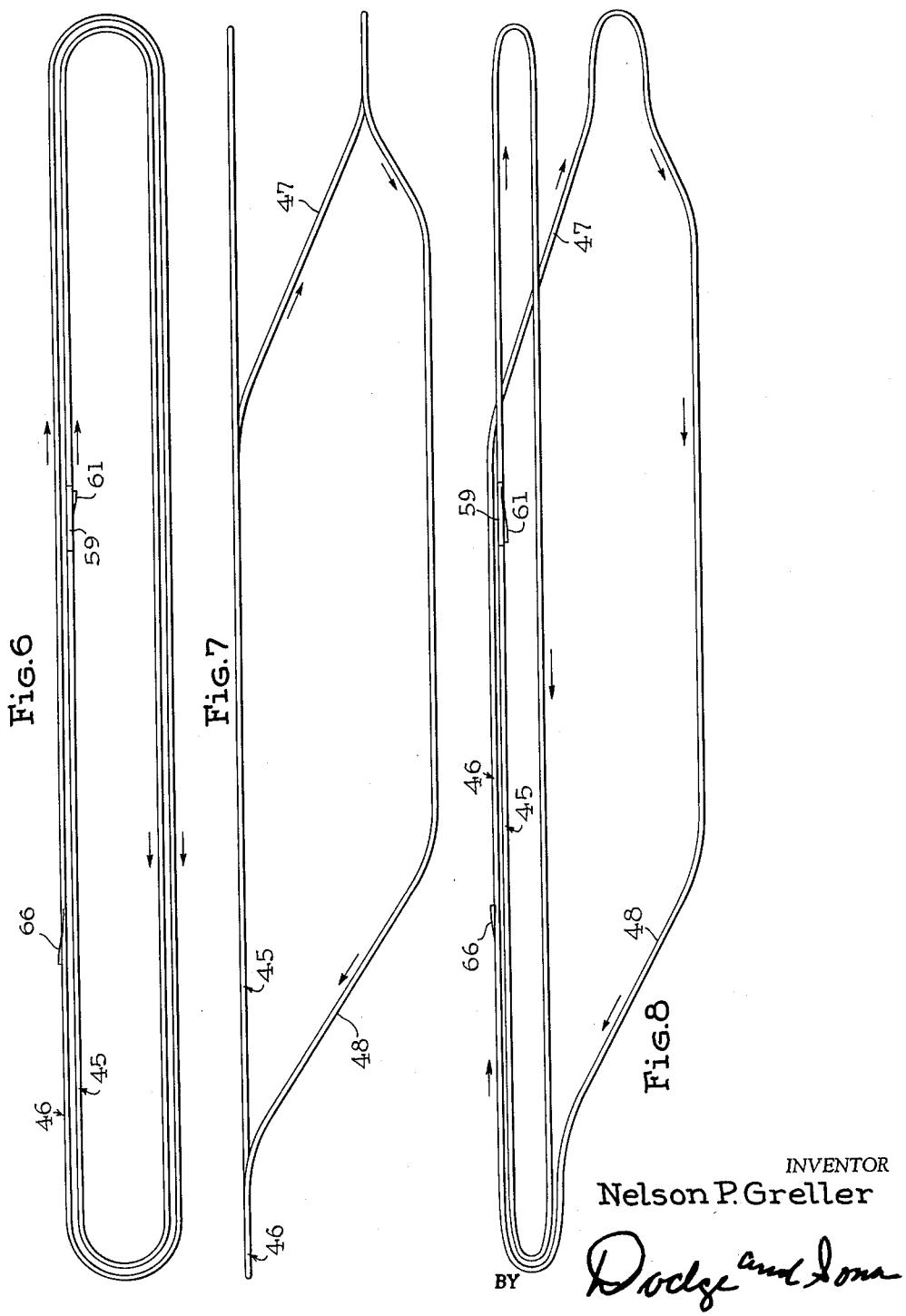

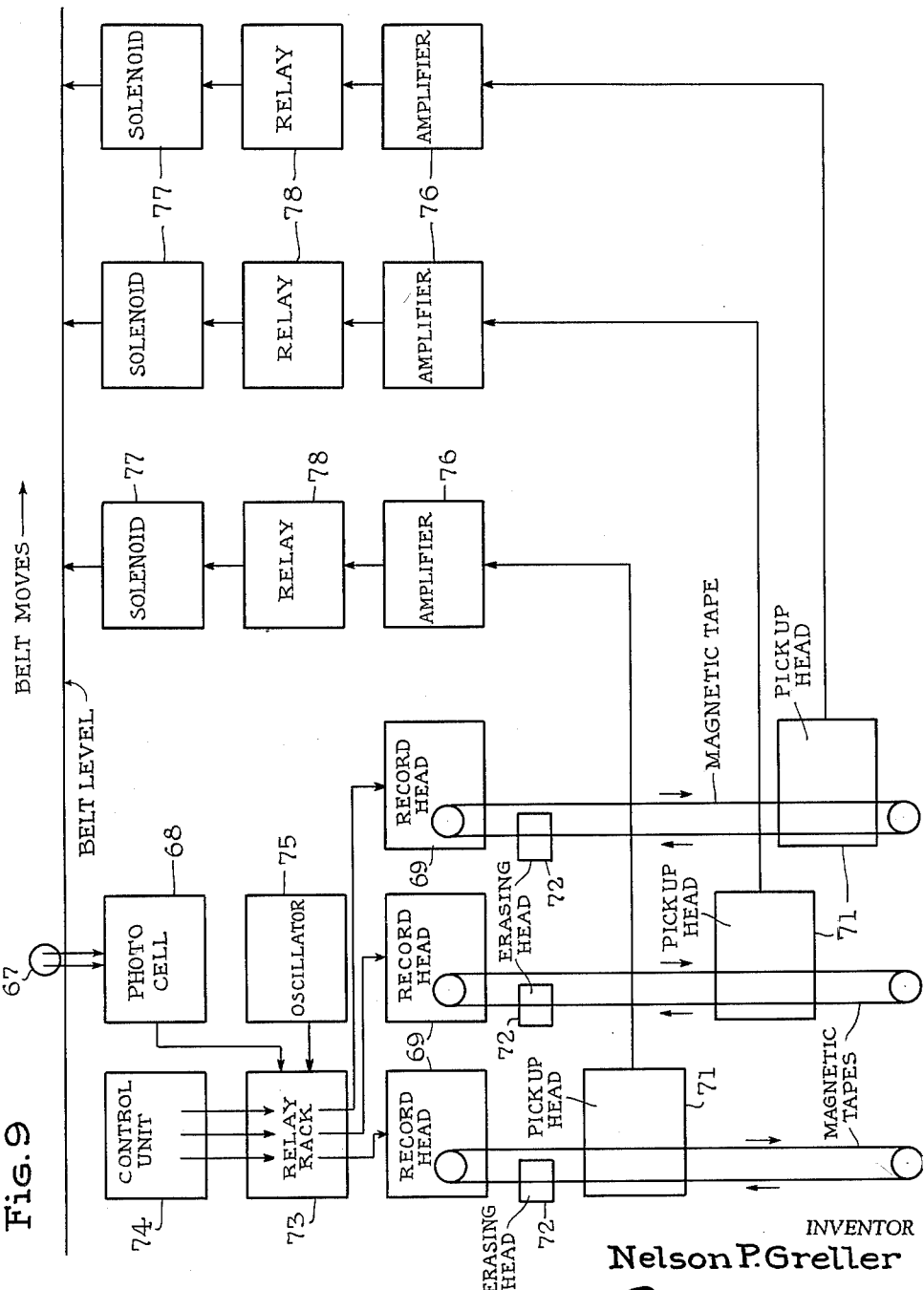

May 16, 1961  N. P. GRELLER  2,984,366
CONVEYOR SYSTEM
Original Filed Jan. 28, 1955  5 Sheets-Sheet 5

INVENTOR
Nelson P. Greller

BY Dodge and Son
ATTORNEYS

United States Patent Office 2,984,366
Patented May 16, 1961

2,984,366

CONVEYOR SYSTEM

Nelson P. Greller, Washington, D.C., assignor to Nelson Laboratories, Inc.

Continuation of application Ser. No. 484,618, Jan. 28, 1955. This application May 13, 1960, Ser. No. 29,117

17 Claims. (Cl. 214—11)

This invention relates to a method of removing a selected article from a moving conveyor at a particular one of a plurality of removal stations and to one embodiment of apparatus capable of performing that method.

This application is a continuation of applicant's copending application Serial No. 484,618, filed January 28, 1955, now abandoned.

In the past, apparatus has been proposed to accomplish the general purpose of this invention, but has been subject to either or both of the following major disadvantages:

(1) Low conveyor speed.
(2) Limited capacity occasioned by large intervals necessarily maintained between conveyed articles.

These disadvantages result from the fact that after the means to remove the article has completed its functional motion, it must move further until it reaches a position out of the path of subsequent articles carried by the conveyor and destined for removal at a different removal station.

The present method concerns moving the diverting means at a speed related to the speed of the conveyed article and in timed relation to article movement. In addition, the extent of the diverting means rendered effective to remove the article is related to the size of the article to be removed.

Specifically, several diverting units are caused to move normally in a path which is out of the path of the conveyed articles. During travel along a portion of this path, the diverting means move diagonally across the conveyor at a speed such that the component in the direction of conveyor travel is substantially equal to the speed of the conveyed article. When it is desired to intercept a selected article, a plurality of the diverting units are caused to move along a path parallel with the portion defined above and at the same speed. Movement of this plurality of diverting units is timed so that the leading edge of the group of units intersects the path of the selected article as the article reaches the point of intersection. In addition to timing the movement of the diverting means in the defined manner, the overall dimension of the plurality of units is controlled so that its projection on a plane parallel with the direction of movement of the conveyed article is substantially equal to the overall length of the selected article, this overall length also being measured in the direction of travel of the article.

It will be apparent, because of their relative sizes and speeds and the timed relation of their movement, that the selected article and the plurality of diverting units employed to remove it will, during removal, move laterally across the conveyor and will maintain a substantially constant alignment laterally of the conveyor. Since the overall dimension of the selected units is related to the size of the article to be removed, articles on the conveyor either immediately ahead of or behind the selected article will not be intercepted by the diverting means. This last statement assumes that the conveyed article is of negligible width transversely of the conveyor and that the related speeds of the diverting units and conveyor do not vary. Obviously these ideal conditions do not exist at all times and it is necessary to maintain a minimum spacing between successive articles on the belt. This minimum spacing is markedly less than that necessary for operation in accordance with any hitherto known methods.

The present method results in marked economies of conveyor operation since spacing is reduced to a minimum and conveyor speed is limited only by the speed of the diverting means relative thereto.

Preferably the length of the article is measured just after it is placed on the conveyor. It may, however, be measured at any point in its travel after placement on the conveyor and in advance of the desired removal station. Conveniently its length is measured as a signal or record which is moved to a signal or record-responsive means which actuates means to move selected diverting units to their intercepting position. The number of units moved is a function of the duration of this signal or record. The signal or record is caused to react on the responsive means after a time interval which corresponds to the length of time it takes the article after measurement to reach the station where it will be removed.

For purposes of making a full disclosure of the inventive method, it will be described as it is practiced in a preferred embodiment of apparatus. The practice of this method is not limited to the use of this apparatus which is selected only for purposes of illustration and explanation. The apparatus at each removal station consists of a diverter unit supported above and spaced from the conveying surface of a moving conveyor, such as a belt conveyor. The unit extends across the belt and extends beyond its edges on each side. At least one pair of sprockets is mounted on the frame, one at each end. Trained around the sprockets and driven by one of them is a drive chain. Supported on the chain is an endless series of vertical guide bearings in each of which is slidable a diverting element. A cam follower, such as a roller, is provided on each diverting element and normally engages a guide rail carried by the unit and serving to sustain the diverting elements in a raised position in which the lower ends of the diverting elements are spaced above the conveying surface sufficiently to permit conveyed articles to pass beneath the unit.

A second guide rail is provided which is normally not engaged by the cam follower or roller. A switch is provided which, when actuated, moves the cam follower out of engagement with the first guide rail and onto the second guide rail. This second guide rail includes a lower section equal in length to the length of the drive chain which is directly above the belt. This lower section is connected with the upper or remaining portion of the second guide rail by means of inclined portions. While the diverting elements are on the lower section of the secondary guide rail, these lower ends reach nearly to the conveyor surface and will act to remove any conveyed articles they intercept. While moving on this section, each diverting element is caused to move transversely of the conveyor at a speed such that each element has a velocity component, in the direction of conveyor travel, substantially equal to the speed of conveyor travel.

The switch's actuation is controlled, manually or automatically, in such a way that a group of diverting elements will shift onto the second rail in such number that their overall length projected in the direction of conveyor travel is equal to the length of the conveyed article to be intercepted by that group of diverting elements. The switching is timed so that the leading element of the group of elements will collide with the leading edge of the conveyed article to be intercepted and removed.

The principal advantage resulting from the use of the apparatus is the ability to remove an article or series of articles at any station without requiring any substantial interval between the article to be removed and preceding or succeeding articles which are not to be removed. In this way, it is possible, even though a relatively high conveyor speed is used, to load the conveyor to maximum capacity, since articles can be placed on the belt with a minimum longitudinal separation. Its use is, however, not limited to performance of the method claimed. It can be used to perform continuous diversion or it may be set to divert only during a predetermined interval of time. This apparatus is shown in the accompanying drawings, in which:

Fig. 1 is a side elevation of a sweep supporting and guiding unit constructed in accordance with the invention.

Fig. 2 is a fragmentary top plan view of the guide rails on which the individual sweeps are guided.

Fig. 3 is a transverse section, substantially at mid-length of the apparatus shown in Fig. 1 and looking to the left of Fig. 1.

Fig. 4 is a detail view partly in section showing the manner in which the sweep is normally sustained by the guide rails.

Fig. 5 is a detail view similar to Fig. 4 showing the manner in which the sweep is supported when it is to be effective to remove a selected article from the belt.

Fig. 6 is a schematic top plan view showing the path of the sweep guiding rails.

Fig. 7 is a schematic view of these rails in side elevation.

Fig. 8 is a schematic perspective view of the sweep guiding rails.

Fig. 9 is a diagrammatic showing of a control circuit to be used to control the operation of the sweep units at each of a plurality of removal stations.

Figure 10:
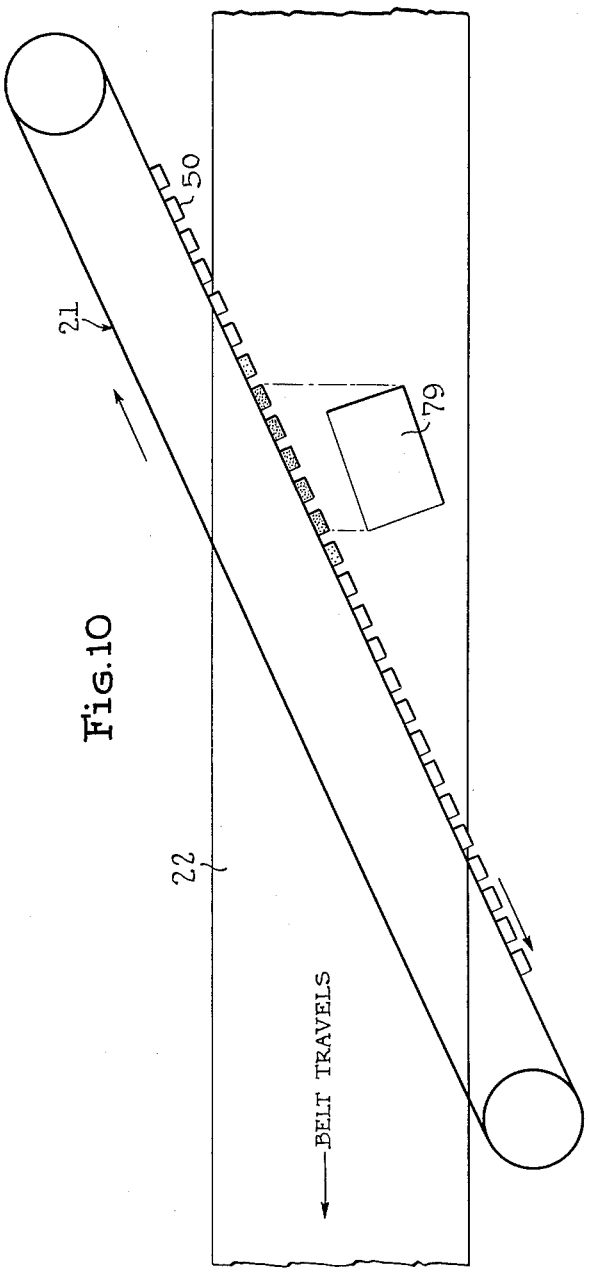
Fig. 10 is a diagrammatic view intended to illustrate the general method of operation of the apparatus according to the inventive method.

Refer first to Fig. 1. The sweep supporting and guiding unit is generally indicated by the reference number 21 and is located above a conveyor belt 22. The unit 21 is sustained by means of hangers, not shown, attached to the frames 23 at opposite ends of the unit. As shown in Fig. 3, the frame 23 comprises uprights 24 which are connected together top and bottom by transverse members 25 and 26. An intermediate transverse member 27 is also attached between the uprights 24. Sustained at the lower ends of the uprights 24 and on each side of the unit 21 is a stringer 28 in the form of an angle iron. The stringers 28 are parallel with the surface of the belt 22.

Similarly supported by the uprights 24 are stringers 29 which are located above and parallel with the stringers 28. The stringers 28 are connected at their ends by transverse members, each of which sustains a bearing 31. Stringers 29 are similarly connected at their ends by a member which carries a bearing 32 which is aligned with the bearing 31. Vertical shafts 33 are journalled in the bearings 31 and 32. The left-hand shaft 33, as shown in Fig. 1, sustains a driven pulley 34 which is connected to be driven by a motor, not shown. The shafts 33 carry spaced sprockets on which are sustained sprocket chains 35. These chains 35 move in a closed loop which is parallel with the surface of the belt.

As shown in Fig. 3, each stringer 28 sustains on its upper surface a guide rail 36 which is circular in cross-section. A similar guide rail 37 is provided on the lower face of each stringer 29. Guided on the guide rail 37 is a series of grooved rollers 38. A second series of guide rollers 39 is similarly supported by the guide rail 36.

Rollers 38 and 39 are connected in pairs to each of a series of vertical straps 41, which are connected at their upper and lower ends to the sprocket chains 35. Secured to the outer face of each of the straps 41 is a tubular member 42. Guide bushings 43 are pressed into the ends of the tubular member 42. At the top of the unit 21 there is provided a member 44 which defines a closed oval loop parallel with the loop formed by the sprocket chains 35. At the inner edge of the member 44 there is provided a sweep guide rail 45 which is circular in cross-section. There is also provided a second sweep guide rail 46 which is sustained in part by member 44 and in part by member 40 (see Fig. 1).

The course followed by the sweep guide rails 45 and 46 will be most easily understood by referring to Figs. 6, 7 and 8. As here shown, the sweep guide rail 45 forms a closed loop which lies in a plane parallel with the surface of the belt 22. The sweep guide rail 46, on the other hand, follows a path which departs from the path of the sweep guide rail 45 throughout a major portion of its travel. This path consists of an inclined portion 47 which extends downward around the end of the unit 21 and across its front face (as seen in Fig. 1), parallel with the surface of the belt 22 and then upward along a portion 48 until it rejoins the path of the sweep guide rail 45. The direction of motion of the sweep units along the guide rails 45 and 46 is indicated by the arrows in Figs. 6, 7 and 8.

The sweep units 50 comprise a tubular member 49 which extends through and is guided by the bushings 43 in the tubular members 42. Attached to the lower end of the tubular member 49 is a foot piece 51. Attached to the upper end of the tubular member 49 is a bracket 52. The outer ends of the foot piece 51 and the bracket 52 are connected by a sheet metal facing 53 of channel form. The bracket 52 carries a stub axle 54 on which is journalled a roller 55. The roller 55 is provided with peripheral grooves 56 and 57. The groove 56 is normally engaged by the sweep guide rail 45. It will be apparent that with the roller in this position the sweeps 50 are normally sustained in a raised position. In this position the lower ends of the sweeps 50 are spaced from the surface of the belt 22 a distance which is sufficient to permit the passage of any package which may be carried thereby.

Refer now to Fig. 2 which is a top plan view of a portion of the sweep guide rails 45 and 46 at the rear of the unit 21 as shown in Fig. 1. The member 44 which supports the sweep guide rails 45 and 46 is cut away as indicated at 58. The sweep guide rail 45, in the region of the cut-out 58, is provided with a rotatable section 59 which is journalled at its ends to the rail 45. A projecting flange 61 is provided on the rotatable section 59 and follows a generally helical course throughout one-fourth of a revolution. Member 59 is connected to be rotated by a reciprocable member 60 which is hinged thereto.

Referring to Fig. 4, the member 60 is there shown in the position which it normally assumes and in which the sweep units 50 are caused to move in the uppermost position. As shown in Fig. 5, the rotatable section 59 is rotated through one-fourth of a revolution by upward movement of the member 60. In this position, the projecting flange 61 carried by the section 59 is engaged by the right-hand flange of the rollers 55 as they pass over this section. The right-hand flange of roller 55 rides up along the helical flange 61 to a point over the center line of the guide rail 45. When it reaches this position, the left-hand flange of the roller 55 has moved to the left past the center line of the guide rail 46. As the roller 55 is moved further to the left by the helical flange 61, the roller 55 drops onto the rail 46. Successive rollers 55 will be diverted by the flange 61 until the member 60 is returned to its normal position (see Fig. 4).

Referring again to Fig. 1, the sweeps 50 indicated by the brackets A are engaged by the guide rail 45 and are sustained in their upper or non-diverting position. The sweep units 50 indicated by the bracket B have been diverted from the guide rail 45 onto the guide rail 46 and are moving downward toward their diverting position. The sweep unit indicated at C is commencing travel across the belt in diverting position. The sweep units 50 indicated by the bracket D have travelled substantially halfway across the belt 22 and are in diverting position. The sweep units 50 indicated by the bracket E have crossed the belt 22 and have started upward toward the plane of the closed loop defined by the guide rail 45.

After the sweeps 50 have moved across the belt in their diverting position and have been returned to the plane of the closed loop of rail 45, they are switched back onto the rail 45 from the rail 46 by a diverter similar to the one which caused them to be diverted onto the rail 46. Referring to Fig. 2, this diverter comprises a helical flange 66 which projects from the rail 46. The switching diverters 61 and 66 are described and claimed in detail in the application of Warren E. Graybeal, Serial No. 692,635, filed October 28, 1957, and assigned to applicant. Use of this particular switch is preferred, but is not essential to the operation of the disclosed apparatus.

Rotation of the section 59 results from reciprocation of the member 60. This member 60 is attached to the core of a solenoid. The control circuit which may be used to control operation of the solenoid is shown in Fig. 9. No limitation to this type of control is implied. Various other controls will suggest themselves to those skilled in the art. It is assumed, in Fig. 9, that the belt is moving from the left to the right. A light source 67 projects a beam of light across the surface of the belt to impinge upon a photo-electric cell 68. This beam of light will be interrupted by the passage of an article between the light source and the photo-electric cell. The photo-electric cell controls the actuation of any one of a plurality of magnetic tape recorders. There is one tape recorder for each removal station. These tape recorders comprise a recording head 69, a pick-up head 71 and an erasing head 72. A relay rack 73 is arranged to be controlled by a control unit 74. The control unit 74 comprises a plurality of switches, there being one switch for each removal station. The operator closes an appropriate switch as the article nears the photo-electric cell 68; the switch being selected with respect to the removal station at which the article is to be removed. Closure of a swich in the control unit 74 conditions the relay rack 73 to supply a signal received from the oscillator 75 to the tape recorder which controls the solenoid at the appropriate removal station.

When the light beam is interrupted, the oscillator 75 supplies a signal to the magnetic tape through the recording head of the appropriate recorder. This signal continues to be impressed until interruption of the light beam is terminated. Thus there is produced on the tape a signal the duration of which is related to the length of time the light beam remained interrupted. This means that this signal is proportional to the length of the article interrupting the light beam; this length being measured in the direction of travel of the article.

The pick-up head which reproduces the signal on the magnetic tape is spaced from the recording head by a distance which is proportional to the belt distance between the photo-electric cell and the solenoid which actuates the diverting switch at the removal station controlled by that recorder. The magnetic tape is caused to move at a speed which is proportional to belt speed. The ratios of belt distance to tape distance and belt speed to tape speed are equal. When the signal reaches the pick-up head, it is energized and supplies a signal to an amplifier 76 which actuates the solenoid 77 through a relay 78. The solenoid 77 remains energized until the signal on the tape has passed through the pick-up head. The signal is removed from the magnetic tape prior to its reentry into the recording head 69, by an erasing head 72.

Fig. 10 is a top plan view, diagrammatic in form, and showing so much of the apparatus as is necessary to understand the underlying concept of the operation necessary to carry out the method of this invention.

The sweep sustaining and guiding unit is generally indicated at 21. Only those sweeps 50 which are on the approach side of the unit 21 are shown. It will be understood that this series of sweeps forms a complete loop around the unit 21. The conveyor belt appears at 22 and an article carried by the belt and to be diverted by the unit 21 is shown at 79. It will be seen that the trace of the sweeps 50 on the approach side of the unit is at an angle to the direction of travel of the belt 22.

In Fig. 10, the angle between the direction of travel of the sweeps 50 and the belt 22 is approximately 25°. The magnitude of this angle is not controlling and it may vary from one in which the trace of the sweeps 50 is at a slight angle to the direction of belt travel to one in which this trace is substantially at right angles to the direction of belt travel. The sweeps 50 on the approach side of the unit 21 are caused to move at a velocity having a component, in the direction of belt travel, which is substantially equal to the velocity of the article carried by the belt. It will be noted that certain of the sweeps 50 are shown darkly stippled. The overall dimension of these darkly stippled sweeps 50, projected on a plane parallel with the direction of belt travel, is equal to the overall length of the article 79. This overall length is measured in the direction of belt travel. Because of the existing speed relationship, the darkly stippled sweeps 50 will, during their travel transversely of the belt, maintain a substantially constant lateral alignment with the article 79.

In order that the article 79 be removed with certainty, it is desirable to time the motion of the darkly stippled sweeps 50 so that the leading unit will strike the article 79 at its forwardmost edge. The timing may be automatically effected by the use of the automatic control unit shown in Fig. 9. It can also be accomplished manually by an operator in position to observe the surface of the belt and who knows the destined removal station of each article on the belt.

Since it is difficult to maintain the speed relationship with absolute accuracy, it is desirable, in switching the sweep units from their non-diverting to their diverting position, to cause more than the minimum number necessary to divert the article to move to diverting position. Some sweeps 50 are shown lightly stippled in Fig. 10. These additional units may be moved to diverting position through the use of either the manual control or the automatic control circuit in Fig. 9.

If a manual control is used, sweep diversion is started a little early and stopped a little late. The same effect can be achieved in the automatic circuit in Fig. 9 by spacing the pick-up head a distance from the recording head which has a ratio to the distance between the light 67 and the removal station, slightly less than the ratio of tape speed to belt speed. This will cause one or more sweeps 50 to be diverted early. The signal on the tape will not be elongated by this but it can be made to persist through an additional interval by delay in action of the relay 78 or solenoid 77.

Referring now to Figs. 1, 2 and 9, the sweeps 50 are normally sustained in their raised position with rollers 55 in contact with the guide rail 45. In this position, the sweeps 50 will not be effective to remove articles carried by the belt. Let it be assumed that an article on the belt arrives at the light source 67 and is to be removed at the first removal station. The operator closes a switch in the control unit 74 which conditions the relay rack 73 to transmit a signal from the oscillator 75 to the left-hand tape recorder when the beam of light is interrupted by the package. Impression of this signal on the magnetic tape continues until the article moves past the light beam at which time the photo-electric cell 58 interrupts the signal from the oscillator 75.

The signal on the magnetic tape moves toward the pick-up head at a speed which is proportional to belt speed. From the record head to the pick-up head it moves a distance which is proportional to the distance between the light source 67 and the first removal station so that the signal arrives at the pick-up head as the article approaches its removal station. As the signal on the tape enters the pick-up head, the solenoid 77 will be energized. This will move the member 60 from its normal position (Fig. 4) to its diverting position (Fig. 5). The member 60 will remain raised so long as the signal is being reproduced in the pick-up head. So long as it remains in this position, the moving sweeps 50, as they reach the helical projection 61, will be diverted to the sweep guide rail 46 in the manner already described.

The diverting units will then follow the rail 46 downward around the end of the unit 21 and back across its front face as is best shown in Fig. 8. The rail 46, on the front of the unit 21, lies in substantially the same vertical plane as the front portion of rail 45 but is beneath it. In this position, the lowermost ends of the sweeps 50 are spaced only a slight distance from the surface of the conveyor belt 22. They will move across the belt and will intercept the article which caused the signal to be impressed on the magnetic tape at the control station.

It is not necessary that the article to be removed be in the center of the belt. It may be at either side of the belt and the operation of the diverter will be the same although it may remain in contact with the diverting sweeps for a longer interval of time if it is on the side of the belt which is nearer to the end of the unit 21 from which the diverting sweeps approach.

It should be apparent that the magnetic tapes can carry more than one signal and that operation of the device is continuous. For example, as shown in Fig. 1, there are three separate groups of sweeps C, D and E which are in an article diverting position. The signals on the magnetic tape are erased after they have passed through the pick-up head and the tape is returned to the recording head in a condition to receive fresh signals thereon.

It has been stated, in connection with the apparatus shown in Fig. 1, that it is driven by a motor which is not shown. It could also be driven through suitable gearing by a snub roller actuated by the belt 22. The magnetic tape can be driven by a snub roller on the belt or from an independent motor. Any apparatus by which the desired relation is caused to exist between sweep speed, belt speed and magnetic tape speed will meet the requirements of this method.

Manual operation of the diverting unit has been referred to. It is possible for an operator to move the member 60 manually, but the automatic controls are preferred since this results in more precise operation and since it reduces the number of persons required for proper operation of the conveyor system.

The operation and control of the removal means at each station is the same as that which has been described for the first station. Therefore, it is not deemed necessary to describe operation and control of these additional removal devices. There may be any number of removal stations. The number of stations is simply limited by the length of the conveyor belt with which they are associated. It is desirable although not necessary that the control station be located at the head end of the belt.

The article to be removed from the belt may take a variety of forms without impairing the reliability of the diverting action. A working embodiment of the apparatus shown in Figs. 1, 2, 3, 4, and 5 has been constructed and has been operated with success to remove small rectangular packages and circular packages. It is possible to remove from the belt an article which has a dimension, in the direction of belt travel, which is several times the width of the belt. For example, a machine has already been built with a belt width of approximately 30 inches and has been used successfully to remove a step ladder approximately 5 feet long. It is not necessary that the article to be removed have a shape which is unchangeable. The machine has been operated successfully to remove bags of shot which are relatively formless. These operations have also been successfully carried out using an earlier embodiment of apparatus to carry out this method. The purpose in remarking on this earlier machine is to emphasize what is said in the preamble to the specification, i.e., that the invention involves both method and apparatus and that the performance of the method is not dependent upon the use of the specific apparatus which is illustrated in the drawings.

What is claimed is:

1. The method of controlling a distributing conveyor of the type in which the conveyor receives articles at a loading station and carries them along a path which leads past a plurality of discharge stations equipped with discharging sweeps movable transversely to the conveyor and each normally inactive but capable of being activated through a variable dimension measured longitudinally of the conveyor, which method consists in feeding articles in succession to the conveyor at the loading station with a small but finite interval between successive articles; making concurrent, moving records of the length of articles leaving the loading station; selecting between said records according to selected discharge stations, while advancing said records at rates similarly related to the rate of conveyor feed; and causing said records to activate the sweeps of corresponding discharge stations and relate the variable dimensions thereof to the length of the article.

2. The method of removing a selected article from a moving conveyor at a predetermined station which consists in determining the length of said selected article measured in the direction of conveyor movement; moving a plurality of sweeping units diagonally across said conveyor at a velocity such that its component in the direction of conveyor travel is substantially equal to the velocity of the conveyor; maintaining said units normally in a position out of the path of articles on said conveyor; moving a selected number of said units to a position in which articles conveyed will be contacted thereby as the selected units move across said conveyor, the selected units having an overall dimension projected in a plane parallel with the direction of conveyor travel substantially equal to the length of the selected article; and timing movement of said selected number so that it intercepts the selected article at said predetermined station.

3. The method of removing an article from a conveyor at one of a plurality of removal stations which method comprises moving a series of sweep units diagonally across the conveyor along a path in which they are out of the path of conveyed articles; causing some of said units to be diverted onto a second path which extends diagonally across said conveyor, the units on the second path intercepting conveyed articles; moving the diverted units at a speed having a component in the direction of conveyor travel substantially equal to the speed of the conveyed articles; starting diversion of sweep units onto the second path as said article reaches a predetermined point in its travel on the conveyor and continuing diversion of sweep units through an interval of time substantially equal to the time required for the article to pass said predetermined point.

4. The method of controlling a distributing conveyor of the type in which the conveyor receives articles at a loading station and carries them along a path which leads past a plurality of discharge stations equipped with discharging sweeps movable transversely of the conveyor and each normally inactive but capable of being activated upon receipt of a variable signal, which method consists in feeding articles in succession to the conveyor at the loading station, producing a signal proportional to the length of each article in the direction of conveyor travel, recording said signals, selecting between said recorded signals according to selected discharge stations, and causing said length signals to activate the sweeps at the corresponding discharge station in accordance with the quantitative value of said signal after a time interval corresponding to the position of the discharge station along the conveyor.

5. The method of removing an article from a moving conveyor at a removal station which method comprises moving a series of sweep units diagonally across the conveyor at a speed having a component in the direction of conveyor travel substantially equal to the speed of the conveyed article, said units moving along either a path which intercepts the article or along a non-intercepting path, and regulating the number of said units on the intercepting path in accordance with the length of the article in the direction of conveyor travel.

6. The method of diverting a conveyed article from its path of travel, which method comprises generating a signal proportional to the length of the article in the direction of conveyance concurrently with the movement of the article past a first selected point in its travel; storing the signal until the article reaches a second selected point in its travel; applying the signal thus stored to activate the diverter and establish the magnitude of same in accordance with the variable characteristic of said signal; and causing said diverter to move the article along a path transverse to the direction of conveyance and at a velocity having a component in the direction of conveyance substantially equal to the velocity of conveyance.

7. A diverter unit to remove conveyed articles from a conveyor comprising a support above the conveyor; guide means carried thereby and including a portion extending angularly across the conveyor; a series of guideways guided by said guide means; a diverting element slidable in each guideway; means driving said guideways along said portion of the guide means; a follower carried by each element; first and second follower guides selectively engaged by said followers, the first follower guide extending across said conveyor parallel with said guide means and serving to support the elements whose followers engage that guide in non-diverting position, said second follower guide including a first portion lying in the same vertical plane as said portion of the guide means and parallel with the conveyor surface, but spaced therefrom by an interval such that the lower ends of diverting elements whose followers engage the first portion of said second follower guide lie in the proximity of the conveyor surface and also including a second portion parallel with and at the same level as said first follower guide; and means operable to switch followers from the first to the second follower guide before passage across the conveyor.

8. A diverter unit operable to remove articles from a conveyor comprising a support above the conveyor; guide means defining a path above the conveyor, said path including a portion extending across the conveyor at an acute angle to the direction of conveyor movement; an endless series of uniformly spaced bearing guides movable on and guided by said means; a diverting element slidable in each bearing guide; a follower carried by each element; a first follower guide defining a closed follower path parallel with and geometrically similar to the path defined by said guide means; a second follower guide including a first section parallel with said portion of the path of the guide means, and so located that the lower ends of diverting elements whose followers engage this section of the second follower guide are in the proximity of the conveyor's surface, said second follower guide also including a second section in the same plane as and parallel with the first follower guide and connecting sections extending between corresponding ends of the first and second sections; and means operable to switch followers from the first follower guide onto the second portion of the second follower guide; means to return followers from said second section to said first follower guide after travel along the first section of the second follower guide; and means to drive said series of guide bearings.

9. A diverter unit to remove conveyed articles from a conveyor comprising a main frame above the conveyor, two vertically spaced guides on each side of the frame, each guide being horizontally aligned with a corresponding guide on the opposite side of the frame, said guides extending diagonally across the conveyor; two axially spaced vertical axis sprockets carried by the frame at each of its opposite ends, each sprocket at one end of the frame being horizontally aligned with a corresponding sprocket at the other end; two drive chains, one trained around each horizontally aligned pair of sprockets; a series of uniformly spaced vertical bearing guides attached to and extending between said chains, said bearing guides being guided on said vertically spaced guides; a diverting element guided by each bearing guide; a first guide rail forming a closed loop parallel with and geometrically similar to the loops formed by said chains; a follower carried by each diverting element and normally engaging said first guide rail; a second guide rail having a first portion in the same plane as said first rail, a second portion parallel with the vertically spaced guides but beneath the plane of the first rail and inclined portions interconnecting the first and second portions; means operable to shift said follower out of engagement with said first rail and into engagement with the first portion of the second rail; and means to drive said chains.

10. A diverter unit to remove conveyed articles from a conveyor comprising in combination a frame extending diagonally across the conveyor; vertical axis sprockets carried at opposite ends of said frame; a chain trained around said sprockets; a plurality of uniformly spaced vertical guides carried by the chain; a diverting element guided by each guide; a follower on each element; an endless guide rail lying in a horizontal plane and normally engaged by said follower and including a portion extending diagonally across the conveyor; a second endless guide rail having a first portion extending diagonally across the conveyor and lying beneath the corresponding portion of the first guide rail; a second portion coplanar with and geometrically similar to a corresponding portion of the first guide rail, and inclined portions interconnecting the first and second portions, diverting elements whose followers engage said first portion having their lower ends in the proximity of the conveyor surface; means to switch said followers out of engagement with the first guide rail and into engagement with the second portion of the second guide rail; and means to rotate one of said sprockets.

11. The method of conveying successive articles away from an intersection selectively along either a first or a second path of conveyance, which method consists in moving a plurality of spaced groups of diverter elements through and away from said intersection in a direction parallel with the second path and at a velocity having a component in the direction of the first path equal to the velocity of conveyance of articles moving along said first path; regulating the effective length of the groups in accordance with the length of the article; and timing movement of said groups and the intervals between said groups so that the groups and corresponding articles to be conveyed from said intersection along said second path pass through said intersection at the same time and so that said intervals and corresponding articles selected for removal from said intersection along said first path pass through said intersection at the same time.

12. The method defined in claim 11 and the step of conveying said articles toward said intersection in a direction parallel with the direction of said first path.

13. The method of removing a selected article in a series of conveyed articles from a conveyor by operation of diverting means which method consists in regulating, during operation of the conveyor, the effective length measured in the direction of conveyance, of the diverting means in accordance with the length of the selected article; and causing said diverting means of regulated effective length to remove said selected article along a path transverse to the direction of conveyance and at a velocity having a component in the direction of conveyance substantially equal to the velocity of the conveyance.

14. In combination, a distributing conveyor of the type in which the conveyor receives articles at a loading station and carries them along a path which leads past a plurality of discharge stations equipped with discharging sweeps movable transversely to the conveyor and each normally inactive but capable of being activated through a variable dimension measured longitudinally of the conveyor; means for making concurrent, moving records of the length of articles leaving the loading station; means to select between said records according to selected discharge stations; means advancing said records at rates similarly related to the rate of conveyor feed; and means, controlled by said records, to activate the sweeps of corresponding discharge stations and to relate the variable dimensions thereof to the length of the article.

15. The combination of a distributing conveyor of the type in which the conveyor receives articles at a loading station and carries them along a path which leads past a plurality of discharge stations equipped with discharging sweeps movable transversely of the conveyor and each normally inactive but capable of being activated upon receipt of a variable signal; means to produce a signal proportional to the length of each article in the direction of conveyor travel; means to record said signals; means to select between said recorded signals according to selected discharge stations; and means activated by the recorded signals to activate the sweeps at the corresponding discharge stations in accordance with the quantitative value of said signal after a time interval corresponding to the position of the discharge station along the conveyor.

16. A method of diverting articles on a conveyor at a diversion station equipped with a plurality of movable article-diverting elements and a diverting element supporting and directing guide which leads across the conveyor at an acute angle to it and which is arranged so that diverting elements moving along it may intercept articles on the conveyor, which method comprises selecting for placement on the guide only that number of elements required to divert the articles selected for diversion; placing these selected elements on the guide when the corresponding articles to be diverted are at a predetermined distance, in the direction of conveyance, from the guide so that the elements will intercept the articles selected for diversion; and moving the diverting elements along the guide at a speed having a component in the direction of conveyance equal to the speed of conveyance.

17. A diverter for removing articles from a conveyor comprising a plurality of movable article-diverting elements; a first diverting element-supporting guide defining a path of movement for the elements which leads across the conveyor at an acute angle to it, the first guide having an entrance at one side of the conveyor and an exit at the other side and being so arranged that elements travelling along it may intercept articles on the conveyor; a second diverting element-supporting guide connected with the exit end of the first guide and arranged to direct the diverting elements back across the conveyor; control means interposed between the exit from the second guide and the entrance to the first guide and operable, in response to a selection of articles to be diverted, to place on the first guide only those diverting elements which are required to divert the selected articles; timing means associated with the control means for causing it to place the diverting elements on the first guide when the corresponding articles are a predetermined distance in the direction of conveyance from the first guide; and means for moving the diverting elements along the first guide at a speed having a component in the direction of conveyance equal to the speed of conveyance.

References Cited in the file of this patent
UNITED STATES PATENTS
2,868,394    Greller _____ Jan. 13, 1959